United States Patent [19]

Stolz

[11] 4,050,138
[45] Sept. 27, 1977

[54] APPARATUS FOR ATTACHING CONNECTORS TO THE ENDS OF A CONVEYOR BELT

[75] Inventor: Hermann Stolz, Mulheim am Main, Germany

[73] Assignee: MATO Maschinen- und Metallwarenfabrik Curt Matthaei GmbH & Co. KG, Offenbach am Main, Germany

[21] Appl. No.: 729,397

[22] Filed: Oct. 4, 1976

[30] Foreign Application Priority Data

Oct. 10, 1975 Germany .............................. 2545401
Oct. 10, 1975 Germany .............................. 2545402
Oct. 10, 1975 Germany .............................. 2545403

[51] Int. Cl.² ........................................... B23P 11/00
[52] U.S. Cl. .................................. 29/243.51; 227/155
[58] Field of Search ................. 29/243.56, 243.5, 283, 29/243.1; 227/143, 144, 155

[56] References Cited

U.S. PATENT DOCUMENTS 1,623,783  4/1927  Diamond ......................... 29/243.51
3,458,099  7/1969  Schick ................................ 227/155

FOREIGN PATENT DOCUMENTS 1,045,191  11/1958  Germany .......................... 29/243.51
714,959  9/1954  United Kingdom ............. 29/243.51

Primary Examiner—James L. Jones, Jr.
Attorney, Agent, or Firm—W. G. Fasse; W. W. Roberts

[57] ABSTRACT

An apparatus for attaching connectors to the ends of a conveyor belt, has a clamping head with upper and lower pressure applying jaws for first bending a connector element over and around the edge of the belt end, and then driving securing elements through the legs of the connector element and through the belt. Bending tools are arranged for bending over the free, protruding ends of the securing elements, preferably into grooves of the connector element. The upper jaw has centering projections which cooperate with centering recesses in the connector element. Catch pins ahead of the upper jaw provide a precentering. A measuring device permits checking the belt thickness for adjusting the jaw spacing. An apertured rail functions as a holder for the connector and securing elements and also as an abutment for the feed advance as well as for the stopping of the clamping head which is stepped from connector element to connector element along the edge of the conveyor belt end.

12 Claims, 19 Drawing Figures

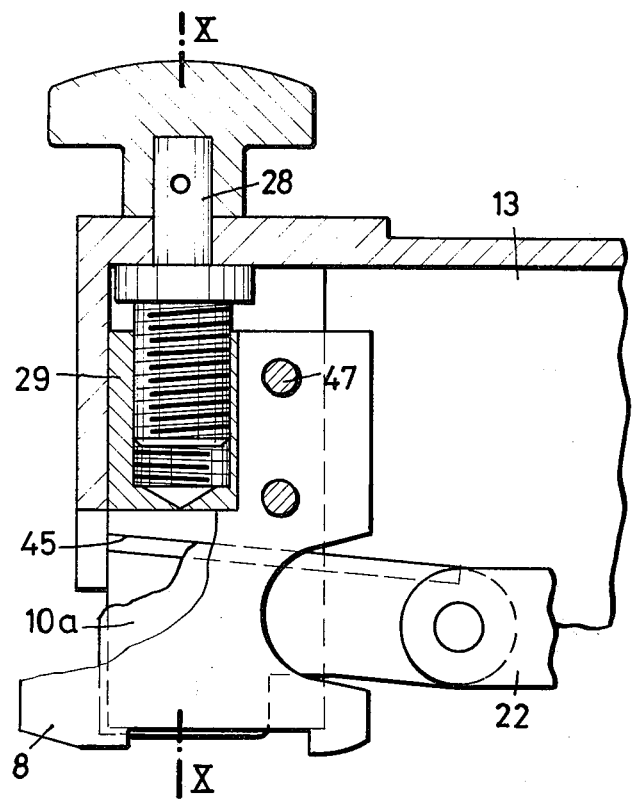
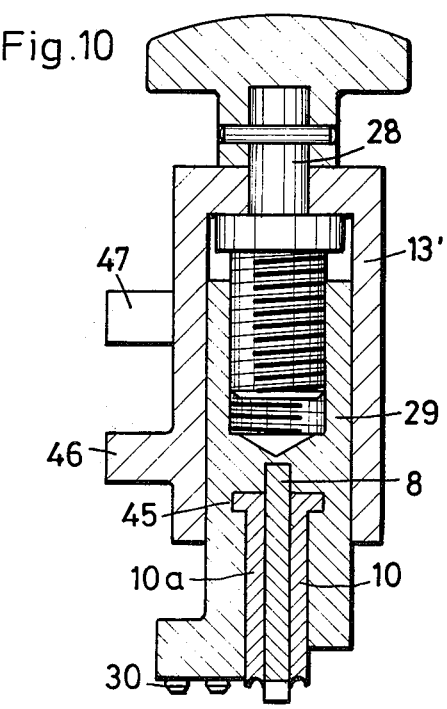

4,050,138

APPARATUS FOR ATTACHING CONNECTORS TO THE ENDS OF A CONVEYOR BELT

BACKGROUND OF THE INVENTION

The present invention relates to an apparatus for attaching connector elements to the ends of a conveyor belt.

Such devices are known in the art and comprise a clamping head including pressure jaws which are displaced on a frame along the forward edge of the conveyor belt, which in turn is securely clamped down in the frame. The pressure jaws are intermittently closed and opened by the actuation of a counter motion toggle lever mechanism for pressing the connector elements, or rather, the legs of the connector elements together and to anchor them to the edge of the belt by driving securing elements such as wire tacks, clasps or the like through the legs of the connector elements and through the belt.

In conventional devices of this type, the legs of the connector elements located on the top surface of the belt, are pressed onto the belt surface. However, a displacement of the holes in the connector legs may occur, especially where varying belt thicknesses are to be handled. As a result, it is not certain whether the tips of the securing elements, such as tacks or clasps, will hit the holes when the securing elements are pressed in. Thus, it is necessary to separately measure the thickness of the various belts.

In connection with the feed advance of the clamping head as it is accomplished in conventional pressure applying clamps, different structural elements are used for the insertion of the connector elements and for providing an abutment for the feed advance of the clamping head. It is also known to arrange the connector elements to be secured to the belt end, in a holding mechanism, a so called comb which receives or holds the so called crown eye or bight of each connector element. However, such an arrangement has the disadvantage that the positioning of the connector elements relative to the pressing-in tool is subject to the tolerances of the holding comb and of the connecting elements themselves. Stated differently, this means that the positioning of the clamping head on the frame necessarily is subject to an error in the order of the manufacturing tolerances of both parts and such errors may become effective in a cumulative manner. This makes it very difficult to achieve a proper alignment of the holes in the legs of the connector elements with the pins of the securing elements.

Where connector elements are used, the securing means of which, such as clasps or the like are anchored on both sides of the legs of the connector elements with a pressure fit, unpermissible deviations in the position of the clamp may result. Such position deviations could at best be avoided by a costly precision manufacturing of the entire apparatus. However, such precision would be rapidly lost in the rough environment of an underground operation, for example, in a coal mine or the like.

It is also known in such prior art pressure applying devices to anchor the tips of the securing elements such as wire tacks, clasps or the like, which pass through the connector elements as well as through the belt, by means of a force directed perpendicularly to the belt surface. For this purpose, prior art tool jaws have beveled surfaces which bend over the wire or clasp tips when the pressure jaws are closed. This type of anchoring is unsatisfactory where securing means are pressed to pass through the belt and are interconnected with a pressure fit for increasing the load strength, on both sides of the two legs of the connector elements. The bending over of the passing through tips by means of beveled surfaces of the tool jaws requires such high forces that the securing means collapse in the belt or below the lower connecting leg. Such collapse of the securing elements results in a completely unreliable belt connection.

Pressing the clasps through the belt and then performing the bending over in a subsequent, separate work step is also not satisfactory because the counter pressure effect of the belt causes a loosening of the upper connector leg after the pressure is released.

OBJECTS OF THE INVENTION

In view of the above, it is the aim of the invention to achieve the following objects, singly or in combination:

to improve the pressure applying devices, especially with regard to the securing of the fixed position of the connector elements at the belt edge so that the above described drawbacks of the prior art are avoided;

to construct the connector elements in the pressure applying jaws in such a manner that the securing or anchoring elements will definitely penetrate into the holes of the connector elements regardless of the belt thickness;

to insert the securing or anchoring elements into the connector elements prior to positioning both elements together into a holding device, thereby avoiding positioning the connector elements with their eyes or bight;

to exactly position the connector elements with the aid of the securing elements which are to be pressed through the belt by the pressure applying jaws;

to simplify the manufacture of the holding device so that it may be produced as a punched out part thereby avoiding the relatively expensive construction of the prior art holding comb for receiving the connector elements; and to utilize a single operational element for several functions simultaneously.

SUMMARY OF THE INVENTION

According to the invention, there is provided an apparatus for attaching connector elements to the ends of a conveyor belt and for anchoring the connector elements by securing elements wherein bending tools are arranged for cooperation with the pressure jaws, said bending tools being located on the side of the conveyor belt on which the tips of the securing or anchoring elements protrude, said bending tools being movable perpendicularly to the direction of pressure application and thus in parallel to the surface of the belt, said bending tools being actuated subsequent to the compression of the connector elements in order to bend over the free ends of the securing elements.

In order to achieve a proper centering of the connector and securing elements relative to the pressure applying jaws the upper pressure jaw is provided, according to the invention, with centering projections for positioning the upper connector leg which itself is provided with centering recesses.

According to a further feature of the invention, there is provided a rail with apertures therein arranged in a row and held on the frame in a fixed position whereby the rail performs substantially four different functions.

The rail acts as a positioning and holding device for the connector elements and for the securing elements. The rail, or rather, the apertures or holes in the rail act as an abutment means for the feed advance pawl of the clamping head. The rail, or rather, the holes or apertures in the rail act as an abutment means for the arresting of the clamping head between its feed advance steps. The rail acts as a holding plate for the guide rods of the clamping head.

BRIEF FIGURE DESCRIPTION

In order that the invention may be clearly understood, it will now be described, by way of example, with reference to the accompanying drawings, wherein:

FIG. 9 is a sectional view along the line IX — IX in FIG. 3 and showing the adjustment means for the position of the upper clamping jaws;

FIG. 10 is a sectional view along the section line X — X in FIG. 9 and showing a section through the adjustment means as well as through the upper clamping jaw and through the bending tools;

Figure 17:
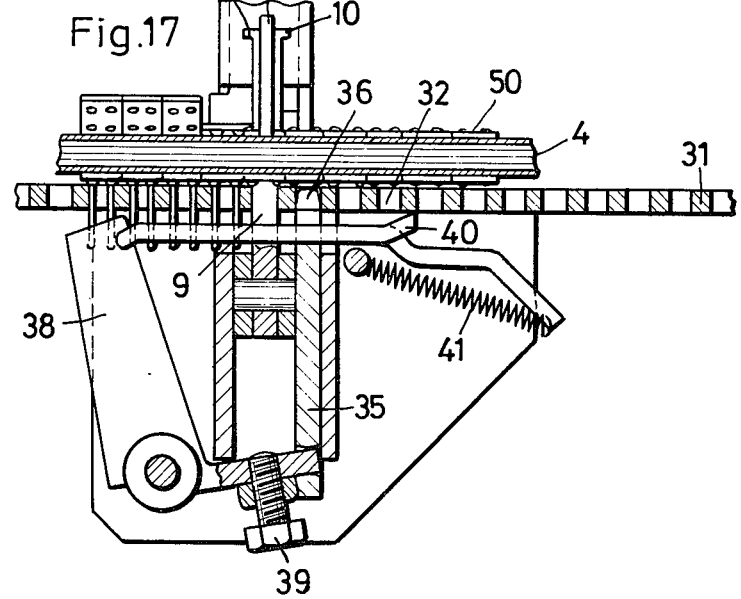
FIG. 17 is a sectional view along section line XVII — XVII in FIG. 16, showing how the upper head of a locking mechanism engages in an aperture of a stationary apertured rail.
Figure 18:
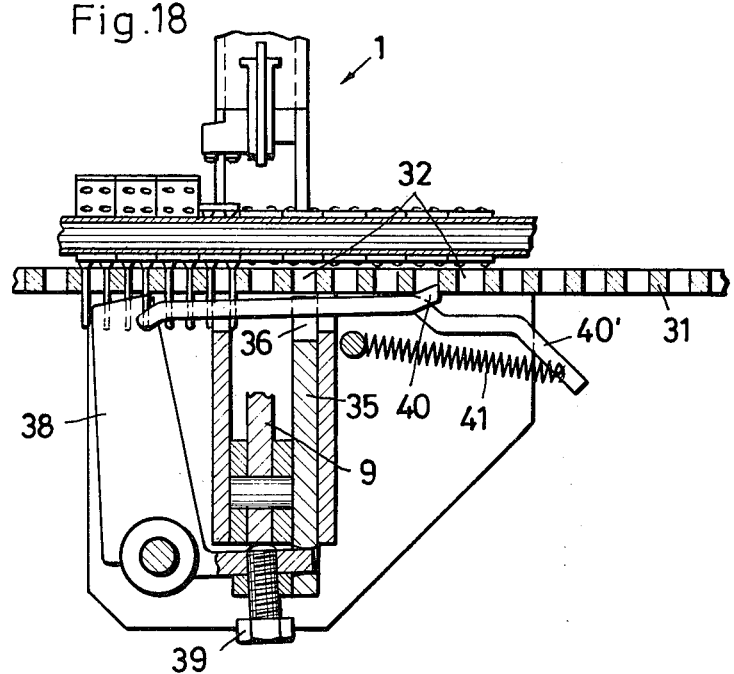
Figure 19:
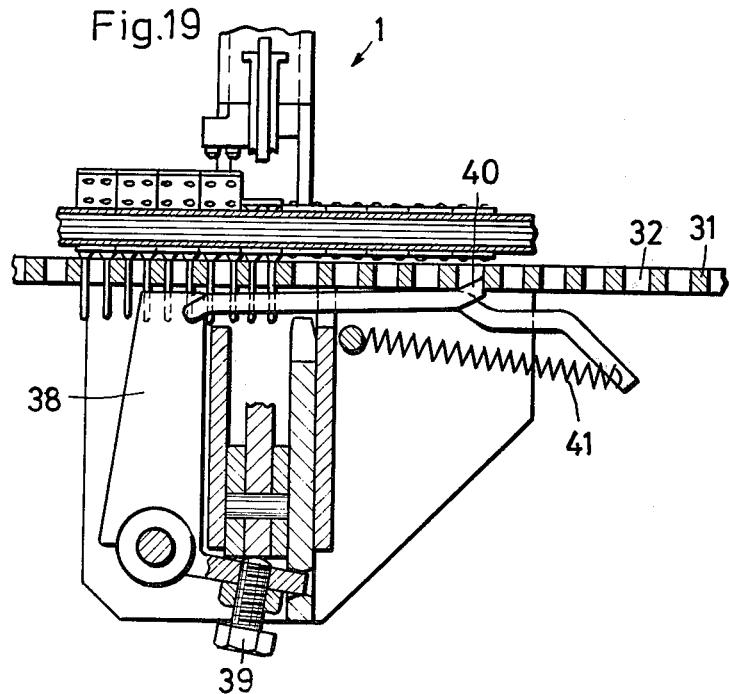

FIG. 18 is also a sectional view similar to that of FIG. 17, but showing the arresting mechanism on its way to disengage from the stationary rail and showing the feed advance mechanism in engagement with the stationary rail for advancing the clamping head by one step corresponding substantially to the width of one connector element; and FIG. 19 is a view similar to that of FIG. 18, but showing the clamping head advanced by one step and ready for pressing-in the next connector element and the next securing element.

DETAILED DESCRIPTION OF PREFERRED EXAMPLE EMBODIMENTS

Figure 1:
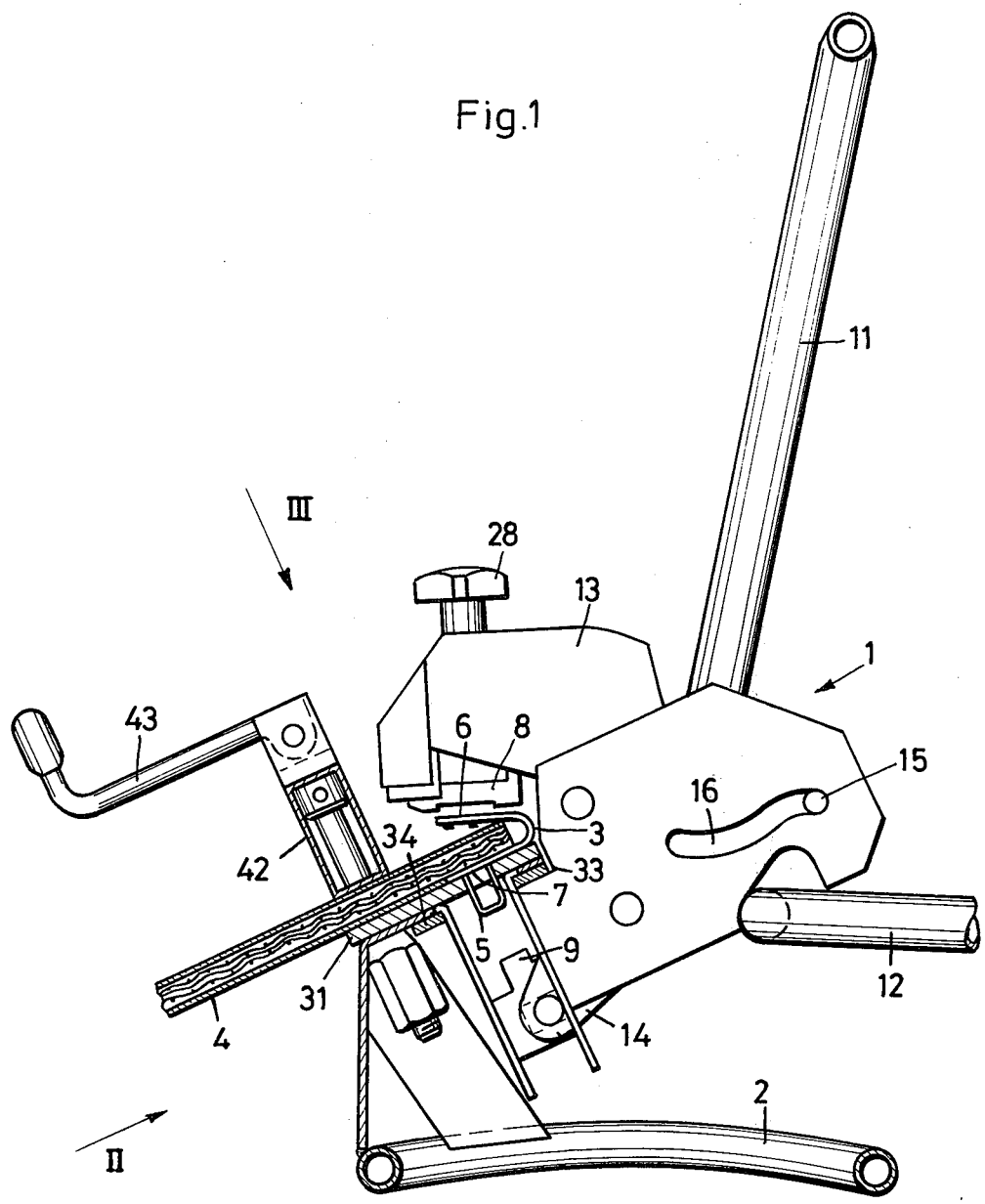
FIG. 1 is a simplified side view, partially in section, of the pressure applying apparatus according to the invention.
Figure 2:
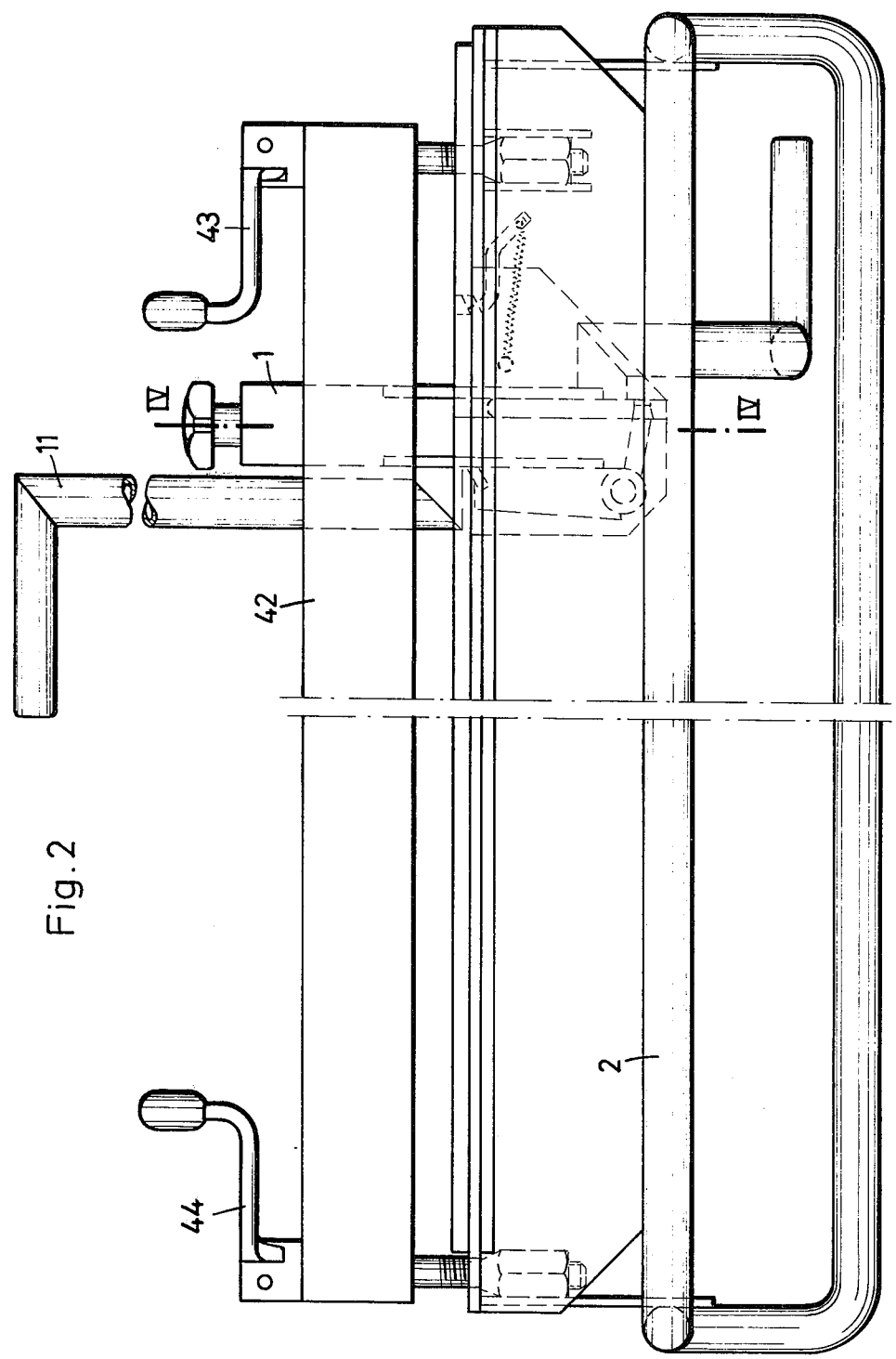
FIG. 2 is a view of the apparatus of FIG. 1 in the direction of the arrow II in FIG. 1.
Figure 3:
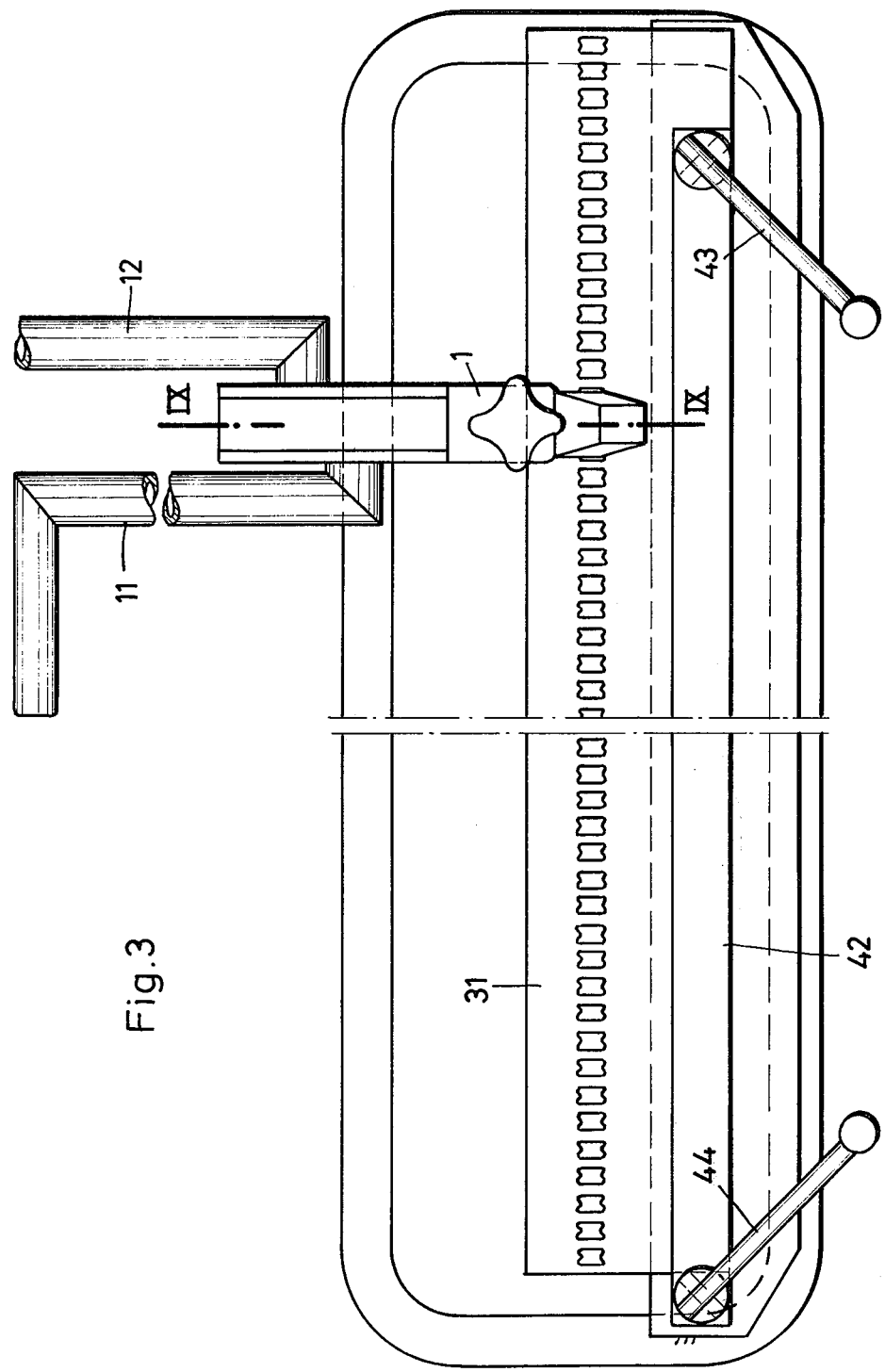
FIG. 3 is a top plan view of the apparatus in the direction of the arrow III in FIG. 1.

In FIGS. 1 and 2 the pressure applying tool or rather the clamping head 1 is located on a base frame 2 by laterally pushing the clamping head 1 into guide rails 33, 34 secured to the bottom of a holding rail 31 to be described in more detail below. The holding rail 31 is secured to the frame 2 by means not shown in detail. The clamping head 1 presses connector elements 3 into a conveyor belt end 4 which is clamped down onto the upper surface of the holding rail 31 by clamping means 42, 43. The clamping head 1 is stepped intermittently along the edge of the belt end 4, or along the edge provided with connector elements, in a successive operation.

The connector elements 3 are inserted, corresponding to the required pressing-in width of the particular belt, into the holding rail 31, whereupon the connector elements 3 are sequentially pressed-in with the aid of the clamping head 1. After the pressing-in of a connector element, the clamping head is laterally shifted on the base frame 2 along the guide rods 33, 34 by a respective spacing step. The belt end 4 is clamped down against the rail 31, as mentioned above, by a clamping rail 42, which is actuated at both ends by means of hand operated cranks 43, 44.

Figure 6:
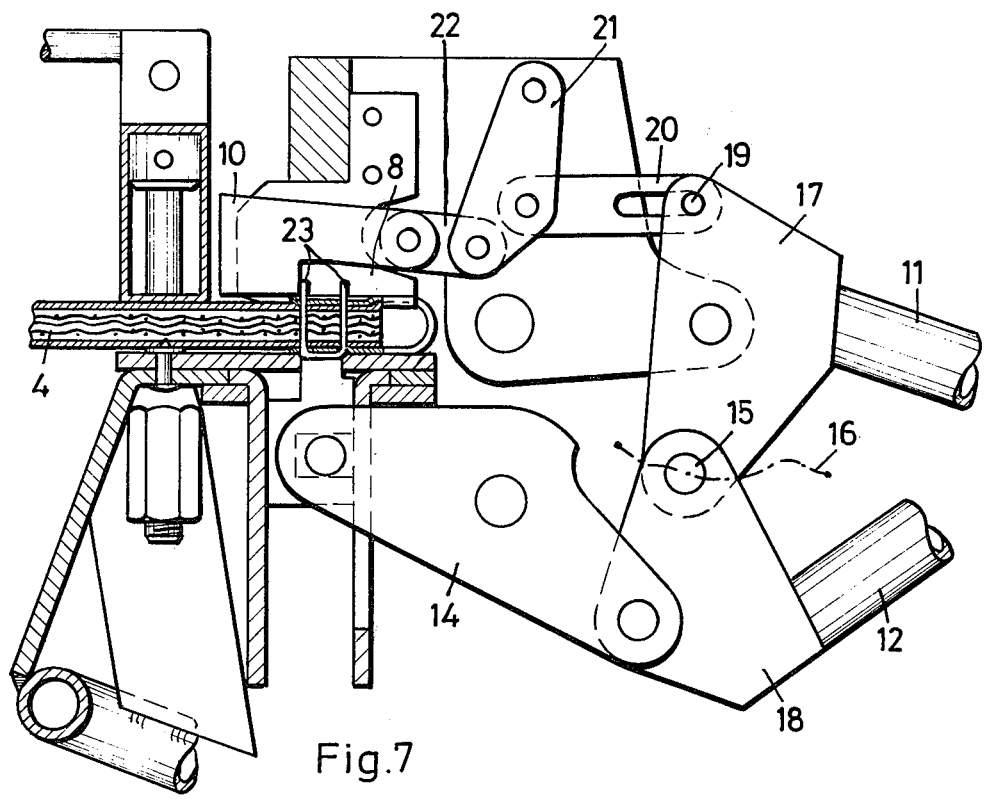
FIG. 6 is a sectional view similar to that of FIG. 4, but showing both clamping jaws in the closed position with the anchoring or securing element extending fully through the connecting element and through the belt end.

The clamping head 1 comprises a counter motion toggle lever mechanism, including among others, the pressing-in levers 13 and 14, which are actuated by operating the two hand levers 11 and 12. A pivot bolt 15 of the toggle lever mechanism travels in a calm curve 16 in such a manner that the first or upper tool or rather, the upper clamping jaw 8, which is connected to the upper pressing-in lever 13, is moved downwardly to press the connector legs 6 onto the belt surface. Thereafter, the lower pressure applying jaw 9 which is actuated by the lower pressure lever 14, strikes the clasps 5 and pushes them through the belt 4 and through the connector legs 6, 7 as best seen in FIG. 6, whereby the upper or free ends 23 of the clasps protrude above the upper leg 6 of the connector element 3.

Figure 7:
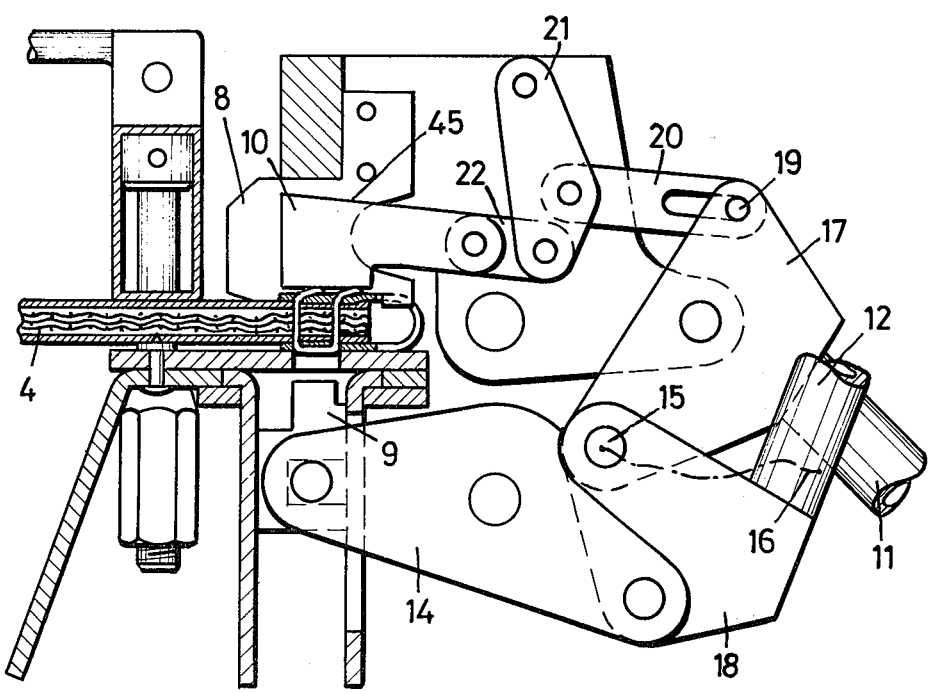
FIG. 7 is a sectional view similar to that of FIG. 4, but showing the operation of the bending tools.

After the completion of the just described procedure, the pivot bolt 15 has reached the dead center of the toggle lever mechanism formed by the two hand lever tie plates 17 and 18. In this position, a driving pin 19 begins to draw the pulling tie plate 20. The driving pin 19 is arranged in the upper hand lever tie plate 13. The pulling tie plate 20 moves the tilting lever 21 which pulls the bending tools 10, 10a to the right, by means of the intermediate tie plate 22 as best seen in FIGS. 6 and 7.

Figure 4:
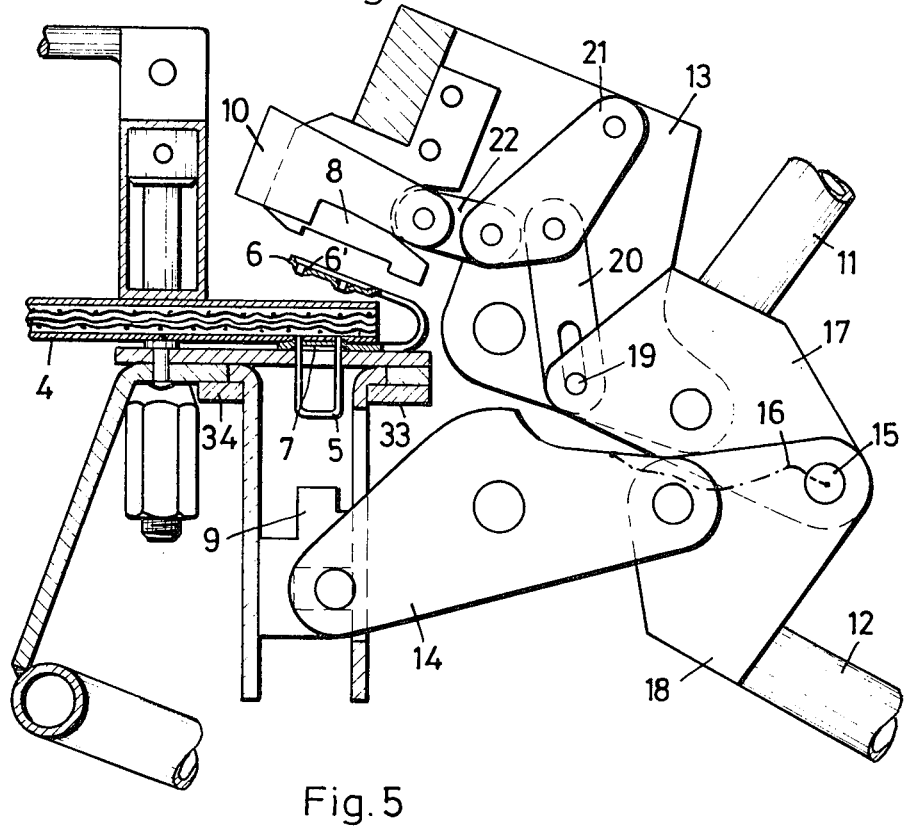
FIG. 4 is a sectional view along the section line IV — IV in FIG. 2 whereby the clamping jaws are shown in the open position.
Figure 5:
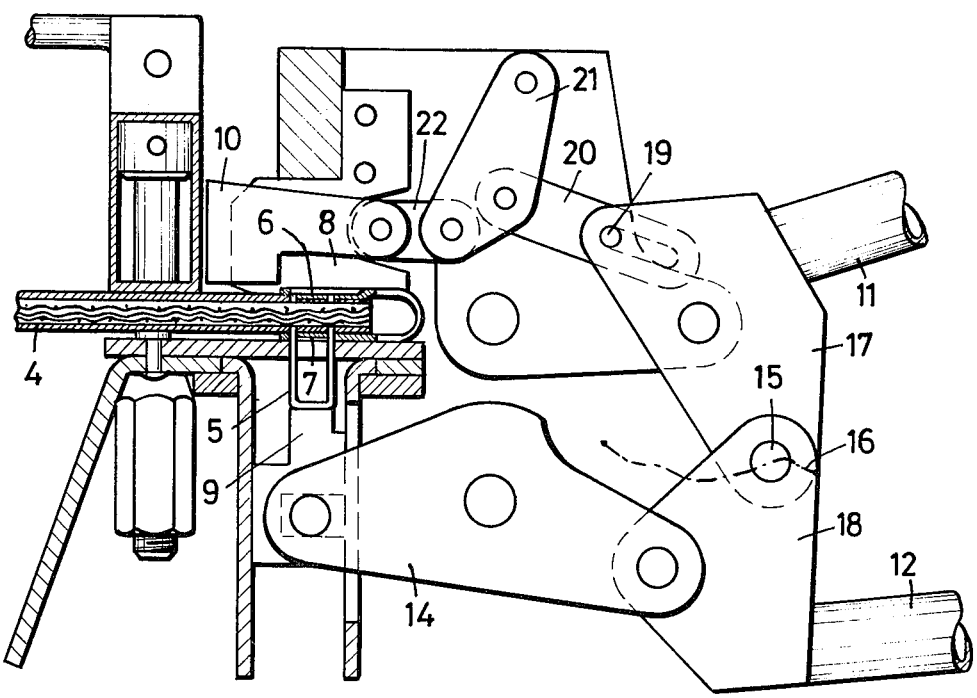
FIG. 5 is a sectional view similar to that of FIG. 4, however, showing the upper clamping jaw in its downward counter holding position and the lower clamping jaw ready to drive the anchoring element through the connecting element and through the belt.
Figure 8:
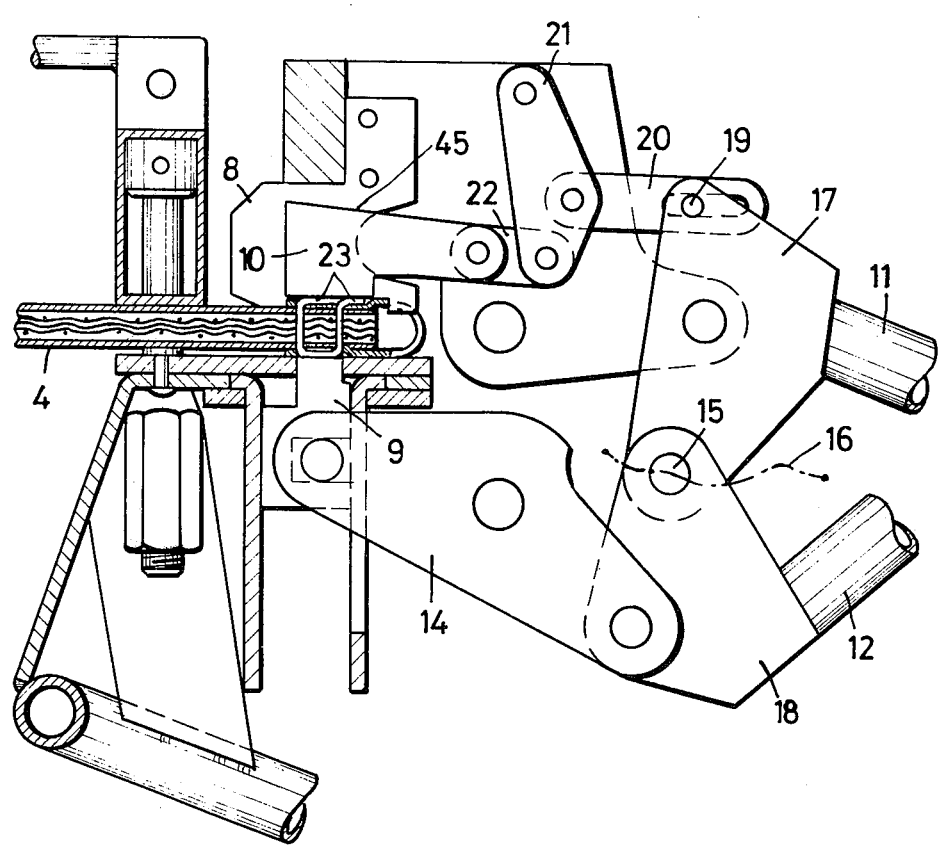
FIG. 8 is a section similar to that of FIG. 4 and illustrating the downward pressure of the bending tool on the bent over tips of the anchoring element.

The bending tools 10, 10a bend over the protruding tips 23 of the clasps 5. After passing through the dead center of the toggle lever mechanism 17, 18, the clamp formed by the upper clamping jaw 8 and by the lower clamping jaw 9, is slightly open. Simultaneously, the closing position of the jaws is reduced by the slanted surface 45 forming part of the bending tools 10, 10a. Due to this feature, an increased force is effective during the return stroke of the moving members 15, 17, 18, 13, and 14. This force is effective on the bending tools 10, 10a in a direction perpendicularly to the belt surface, whereby said increased force presses the bend over tips 23 of the clasps 5 into the grooves 6' of the upper leg 6 of the connector elements 3. Please see FIGS. 4 and 8 in conjunction.

Subsequent to the passing of the dead center during the opening movement of the clamping device or head 1, the drive pin 19 shifts the bending tools 10, 10a back into their starting position. It is an advantage of the just described mechanism that it makes possible an energy saving operation. This is so, because the work power available at the hand levers, which is limited in hand operated clamping devices, is utilized advantageously because the opening movement of the clamping device is also utilized for the finished pressing.

In the light of the above description it will be appreciated that the bending tools are connected to the toggle lever mechanism, 17, 18 of the pressure applying jaws 8, 9 in such a manner that the bending over of the free ends 23 takes place during and after the overriding of the dead center of the toggle lever mechanism.

Due to the slanted surface 45, the bending tools are guided in such a manner that the work pressure thereof is larger when the toggle lever mechanism 17, 18 overrides its dead center on its return stroke than when overriding its dead center on its forward stroke.

The just described apparatus operates as follows. First, the upper pressure applying jaw 8 is moved against the upper surface of the belt 4, whereby the upper connector leg 6 is brought into a position extending in parallel to the lower connector leg 7. Thereafter the lower pressure applying jaw 9 passes upwardly against the securing or anchoring element 5 to force the free legs of the securing element 5 through the holes 49, see FIG. 11, until the free ends 3 protrude above the upper leg 6 of the connector elements 3.

Thereafter, these protruding ends 23 are bent over by the bending tools 10, 10a performing a motion extending in parallel to the belt surface, that is, perpendicularly to the direction of the pressing-in pressure exerted by the clamping jaws 8 and 9. The bent over tips are then pressed into the grooves 6' by a pressure extending perpendicularly to the belt surface.

Figure 11:
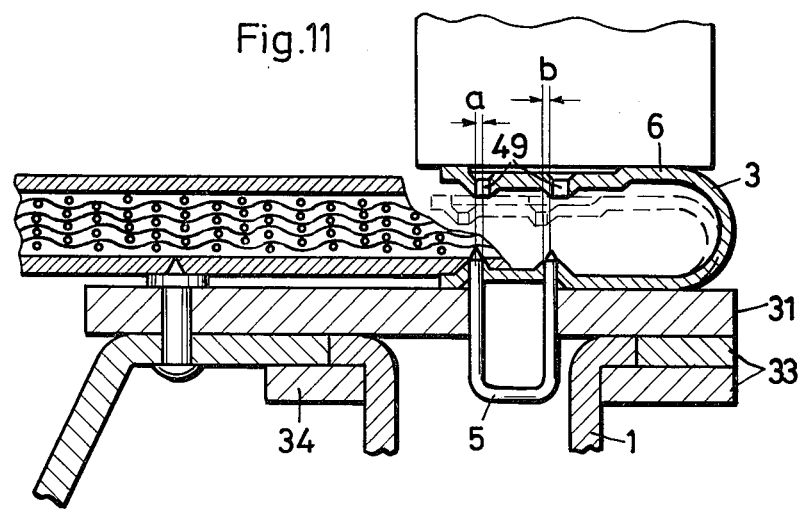
FIG. 11 shows a sectional view similar to that of FIG. 4, however, on an enlarged scale and omitting details so that the position of the holes in the legs of the connector element may be shown in connection with two different belt thicknesses.
Figure 13:
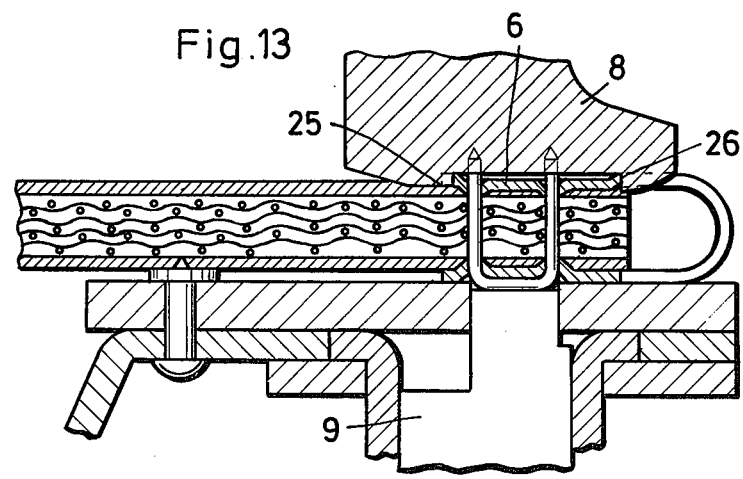
FIG. 13 is a sectional view similar to that of FIG. 11 and illustrating the centering projections of the upper clamping jaw.
Figure 14:
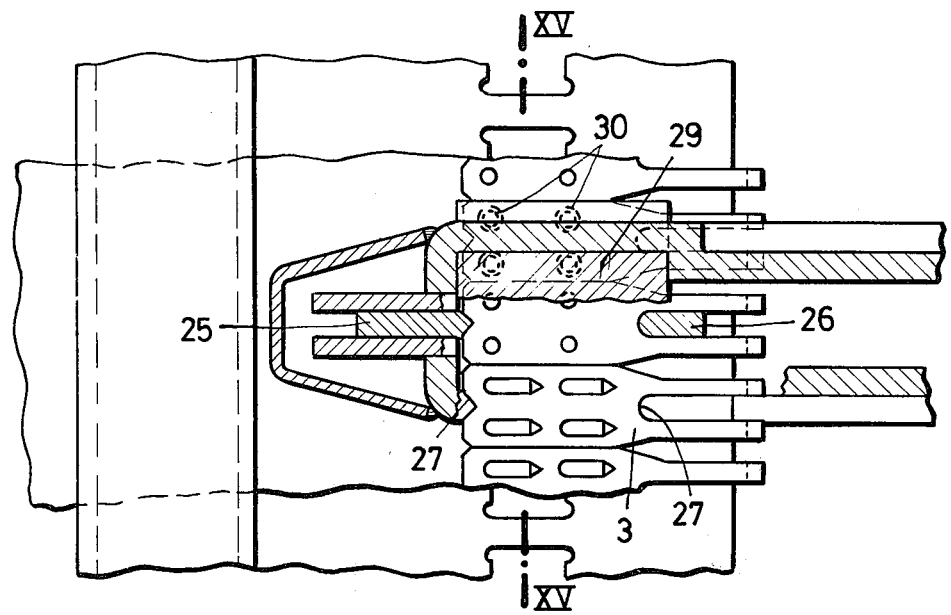
FIG. 14 is a top view of the connector elements with the centering device in the engaged position.

Referring to FIG. 11, it will be noted that the central, vertical axis of the holes 49 trails or legs behind the middle axis of the pins of the clasps 5 by a distance "a" where thick belts are used. Where the belt thickness is average, it is however, possible to align the middle axes of the holes 49 and of the clasps 5. On the other hand, where thin belt thicknesses are involved, the middle axis of the holes 49 and the upper connecting leg, leads by the distance "b" relative to the middle axis of the legs of the clasps 5. The above described centering means 25, 26, and 27 are provided for compensating such different belt thicknesses. As shown in FIGS. 13 and 14, the centering projections 25, 26 are arranged to protrude from the underside of the upper pressure jaw 8.

Figure 12:
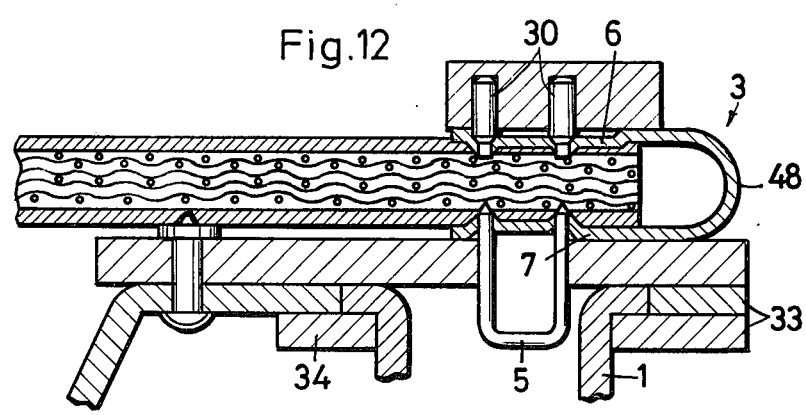
FIG. 12 shows a view similar to that of FIG. 11, however, along a section plane extending in parallel to the section plane of FIG. 11 to illustrate the preliminary centering.
Figure 15:
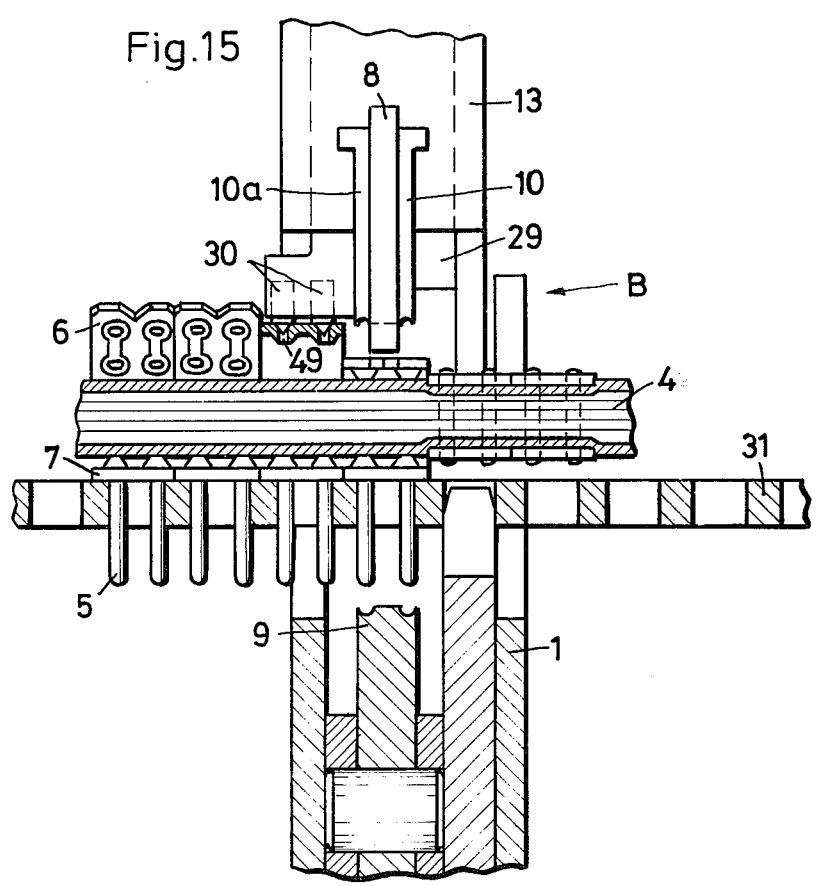
FIG. 15 is a sectional view along the section line XV — XV in FIG. 14 and showing the position of the precentering catch pins relative to the upper clamping jaw and the bending tools.

Further, as shown in FIG. 14, the legs of the connecting elements 3 are provided with centering recesses 27. In order to achieve a certain engagement of the centering projections 25, 26 into the centering recesses 27, there are provided catch pins 30 for engagement into the holes 49 of the upper connector legs 6 as shown in FIG. 15. The catch pins 30 are arranged on the forward side or face of the jaw carrier 29, as viewed in the movement direction of the clamping head 1 indicated by the arrow B in FIG. 15. In operation, the jaws 8 and 9 secure a preceeding connector element 6 to the belt while the catch pins 30, enter into the holes 49 of the next following connector element. In this connection reference is made to FIG. 12, showing on an enlarged scale, a section similar to that of FIG. 11 and illustrating the upper connector leg 6 and the catch pins 30, after completion of the pressure applying step by means of which the upper connector leg was pressed into the belt surface so that it now extends in parallel to the lower connector leg 7. As a result, the upper connector leg 6 has been so positioned, as it was pressed downwardly, that the center axis of the holes in the two connector legs 6 and 7 register with each other. Since the crown eyes or bights 48 of the connector elements 3 are not held in a holding device in a form locking manner, it is possible to accomplish the length compensation as mentioned with reference to FIG. 11, which becomes necessary due to the positioning, by a respective deformation of the crown eyes or bights 48.

FIGS. 13 and 14 illustrate how the centering projections 25, 26 of the upper pressure applying jaw 8 engage into the recesses 27 of the upper connector leg 6. The sure function of the above described pressing-in operation requires that the pressure applying tools, namely the upper and lower pressure jaws 8 and 9 are precisely adjusted with regard to the respective belt thickness. Otherwise, the parallel positioning of the upper connector leg 6 in contact with the upper pressure jaw 8 is not achieved, because the counter pressure of the belt on the connector leg does not become sufficiently large if the adjustment of the belt thickness is too large.

In order to provide for a proper adjustment of the spacing between the pressure applying jaws 8, 9 an adjustment screw 28 is provided as described above. In order to further facilitate the ascertaining of the belt thickness, a measuring device is arranged with a measuring table 46 and a measuring bolt 47 on the upper pressing-in lever 13 for adjusting the upper pressure applying jaw to the respective belt thickness. Preferably the measuring bolt 47 is actuated by the adjustment screw 28 for the upper pressure applying jaw 8.

The combination of the measuring elements including the measuring bolts 47 and the support or table 46 for the belt 4 with the pressure applying means has the advantage that it is not necessary to measure the belt thickness in a separate step by a suitable measuring device such as a gauge and then adjust the spacing between the pressure applying jaws 8 and 9 by means of said adjustment screw 28. The described combination requires but one adjustment of the screw and this adjustment already takes the belt thickness into account if the belt is simply positioned on the support table 46. The measuring table 46 is rigidly secured to the housing 13' of the upper pressure applying lever 13 as best seen in FIGS. 9 and 10. If desired, the support table 46 may form an integral part of the housing 13'. The measuring pin 47 is fixed to the upper pressure applying jaw 8, for example, by screws or rivets or the like so that it necessarily participates with the adjustment of the jaws 8 by the rotation of the adjustment screw 28, as best seen in FIG. 10. In other words, adjusting the holding member 29 of the upper jaw 8 up and down in the housing 13' with the screw 28 automatically also adjusts the position of the measuring pin 47.

The just described combination of elements makes it possible to adjust the position of the pressure jaw 8 in accordance with the belt thickness which has been ascertained between the support table 46 and the measuring pin 47. For this purpose, the belt end of the belt 4 is merely placed on the support table 46 and the adjustment screw 28 is adjusted until the measuring pin or bolt 47 contacts the belt surface.

Figure 16:
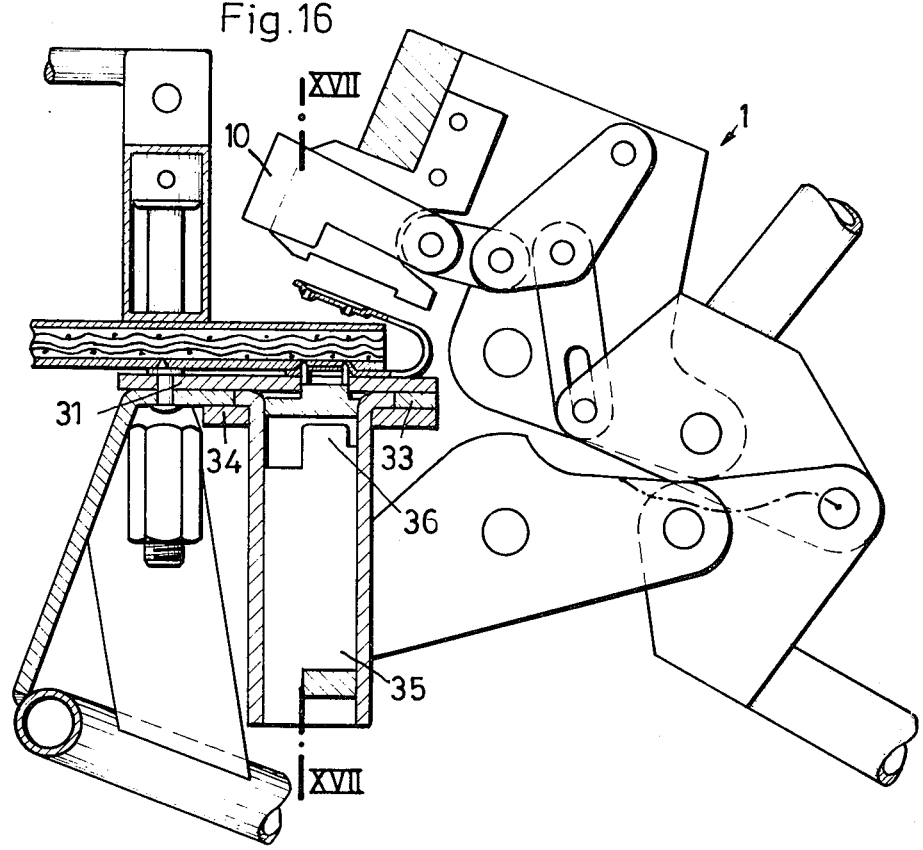
FIG. 16 is a sectional view similar to that of FIG. 4, but showing an arresting mechanism for keeping the clamping head and with it the connector element as well as the securing element stationary during the operation of the upper pressure applying clamping jaws.

FIGS. 16, 17 and 18 illustrate the functions of the rail 31 with its holes or apertures 32 in more detail. FIG. 16 illustrates the clamping head 1 inserted into the guides 33 and 34. When the first position of the clamping head 1 is reached in alignment with the first clamp 50, the latter is pressed into the belt 4 by the actuation of the hand levers shown in FIG. 1, whereby the head 36 of the lock bolt 35 first secures the position of the clamping head 1 by engaging one of the holes 32 during the pressing operation. This operation has been described above.

Toward the end of the motion of the hand levers 11 and 12, the lower pressure applying jaw 9 impacts on the adjusting screw 39, as shown in FIG. 17, thereby operating the feed advance lever 38 which pulls the lock bolt 35 out of the opening 32. Simultaneously, the feed advance pawl 40 engages the inner edge of the respective holes 32 as shown in FIG. 18. The pawl 40 is connected to the free end of a return spring 41 by an extension 40'. After the engagement of the pawl 40 with a respective hole 32, the clamping head 1 is laterally displaced by one spacing step corresponding to the width of the connector elements 3.

The next pressing-in operation starts with the return stroke of the feed advance pawl 40 and the arresting of the clamping head 1 by the head 36 of the locking bolt 35, whereby the feed advance lever 38 is tilted back by the return spring 41 to push the lock bolt 35 upwardly.

Due to the fact that the apertured rail 31 permits the locking of the pressure applying jaws, when the pressure is applied, and also permits the positive feed advance from step to step, the above mentioned cumulative effect of tolerance is avoided during the positioning because such tolerances are automatically compensated by the feed advance where deviations in the spacing should occur. Simultaneously, displacements of the clamp during the pressing operation is also avoided by the lock or latch 35, 36. The locating of the clamping head 1 is directly in the guide 33, 34 secured to the holding rail 31, further improves the precise positioning of the clamping mechanism.

Although the invention has been described with reference to specific example embodiments, it is to be understood that it is intended to cover all modifications and equivalents within the scope of the appended claims.

I claim:

1. An apparatus for attaching connector means to the ends of a conveyor belt and for anchoring said connector means by securing elements, comprising frame means, clamping means including pressure applying upper and lower jaw means, a counter motion actuating lever mechanism supported on said frame means, said upper and lower jaw means being operatively connected to said counter motion lever mechanism for intermittently closing and opening said pressure applying upper and lower jaw means, said apparatus further comprising bending tool means, operatively connecting said bending tool means to said actuating lever mechanism for operating the bending tool means subsequently to the actuation of said upper and lower jaw means and in a direction extending perpendicularly to the direction of pressure application by said jaw means, said bending tool means being arranged on that side of said conveyor belt on which the free ends of said securing elements protrude from said conveyor belt whereby said free ends of the securing elements are bent over.

2. The apparatus according to claim 1, wherein said means operatively connecting said bending tool means to said actuating lever mechanism are arranged to cause the bending over of said free ends of the securing means during and after said actuating lever mechanism passes through its dead center.

3. The apparatus according to claim 2, wherein said means operatively connecting said bending tool means to said actuating lever mechanism comprise guide means for said bending tool means whereby the latter exert a bending pressure on said free ends of the securing elements, which bending pressure is larger when the actuating lever mechanism passes its dead center on its return stroke than when passing the dead center on the forward stroke.

4. The apparatus according to claim 3, wherein said guide means comprise a slanted surface.

5. The apparatus according to claim 1, wherein said connector means comprise centering recesses, and wherein said apparatus further comprises centering projections arranged on said upper pressure applying jaw means for cooperation with said centering recesses of the connector means.

6. The apparatus according to claim 1, further comprising catch pin means arranged on the front face of said pressure applying jaw means as viewed in the direction of feed advance of said clamping means, said connector means having holes therein through which said securing elements pass during the subsequent clamping operation, said catch pin means engaging said holes for precentering said connector means.

7. The apparatus according to claim 6, wherein said catch pin means are secured to the front face of said upper pressure applying jaw means.

8. The apparatus according to claim 1, wherein said clamping means comprise upper and lower pressure applying lever means, said apparatus further comprising measuring means for ascertaining the thickness of said conveyor belt, said measuring means being arranged at said upper pressure applying lever means, said measuring means including a support for said conveyor belt and a measuring pin movable toward and away from said support.

9. The apparatus according to claim 8, further comprising adjustment screw means for said pressure applying upper jaw means, said measuring pin being operatively connected to said adjustment screw means of said upper jaw means.

10. The apparatus according to claim 1, further comprising rail means arranged in said frame means, said rail means having apertures therein, said apparatus further comprising feed advance means for said clamping means and arresting means for said clamping means, said arresting means and said feed advance means cooperating alternately with said apertures in said rail means whereby said rail means forms an abutment for the feed advance means and for the arresting means.

11. The apparatus according to claim 10, wherein said rail means is arranged as a positioning means for said connector means and for said securing elements.

12. The apparatus according to claim 10, wherein said rail means comprise guide means for receiving and guiding said clamping means.

* * * * *

UNITED STATES PATENT OFFICE
CERTIFICATE OF CORRECTION

Patent No. 4,050,138            Dated September 27, 1977

Inventor(s) Hermann Stolz

It is certified that error appears in the above-identified patent and that said Letters Patent are hereby corrected as shown below:

Column 8, line 5, before "operatively" insert --means--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*